US012101601B2

(12) United States Patent
Chen et al.

(10) Patent No.: US 12,101,601 B2
(45) Date of Patent: Sep. 24, 2024

(54) PIEZOELECTRIC MICROELECTROMECHANICAL SYSTEM MICROPHONE WITH OPTIMIZED OUTPUT CAPACITANCE

(71) Applicant: SKYWORKS SOLUTIONS, INC., Irvine, CA (US)

(72) Inventors: Guofeng Chen, Fremont, CA (US); You Qian, Singapore (SG); Rakesh Kumar, Singapore (SG); Michael Jon Wurtz, Lake Oswego, OR (US); Humberto Campanella-Pineda, Singapore (SG)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 126 days.

(21) Appl. No.: 17/929,071

(22) Filed: Sep. 1, 2022

(65) Prior Publication Data

US 2023/0072672 A1 Mar. 9, 2023

Related U.S. Application Data

(60) Provisional application No. 63/241,131, filed on Sep. 7, 2021.

(51) Int. Cl.
*H04R 17/02* (2006.01)

(52) U.S. Cl.
CPC ....... *H04R 17/02* (2013.01); *H04R 2201/003* (2013.01)

(58) Field of Classification Search
CPC .... H04R 17/02; H04R 7/08; H04R 2201/003; B81B 2203/0127
See application file for complete search history.

(56) References Cited

U.S. PATENT DOCUMENTS

| | | | |
|---|---|---|---|
| 9,055,372 | B2 | 6/2015 | Grosh et al. |
| 10,964,880 | B2 | 3/2021 | Grosh et al. |

(Continued)

FOREIGN PATENT DOCUMENTS

| | | | |
|---|---|---|---|
| EP | 3557881 | A1 | 10/2019 |
| JP | 2008118639 | A | 5/2008 |
| JP | 2019140638 | A | 8/2019 |

OTHER PUBLICATIONS

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

(Continued)

*Primary Examiner* — Sunita Joshi
(74) *Attorney, Agent, or Firm* — Lando & Anastasi, LLP

(57) ABSTRACT

A microelectromechanical system microphone includes a piezoelectric diaphragm, upper inner electrodes and upper outer electrodes disposed on an upper surface of the diaphragm, and lower inner electrodes and lower outer electrodes disposed on a lower surface of the diaphragm. The diaphragm is divided into a plurality of sectors, a first of the sectors including an inner and an outer upper electrode physically disconnected from an inner and an outer upper electrode on a second sector adjacent to the first sector, and an inner and an outer lower electrode physically disconnected from an inner and an outer lower electrode on the second sector. A first via extends between and electrically couples the upper and lower inner electrodes of the first sector and a first bond pad. A second via extends between and electrically couples the upper and lower outer electrodes of the second sector and a second bond pad.

21 Claims, 17 Drawing Sheets

(56) References Cited

U.S. PATENT DOCUMENTS

| | | | |
|---|---|---|---|
| 2016/0219375 A1* | 7/2016 | Hall | H10N 30/101 |
| 2019/0281393 A1 | 9/2019 | Grosh et al. | |
| 2019/0327562 A1 | 10/2019 | Cerini et al. | |
| 2020/0148532 A1 | 5/2020 | Grosh et al. | |
| 2020/0351595 A1 | 11/2020 | Rusconi Clerici Beltrami et al. | |
| 2020/0382876 A1 | 12/2020 | Cerini et al. | |
| 2021/0051413 A1 | 2/2021 | Hui et al. | |
| 2021/0084423 A1 | 3/2021 | Rusconi Clerici Beltrami et al. | |
| 2021/0120346 A1 | 4/2021 | Hui et al. | |
| 2021/0136483 A1 | 5/2021 | Hsieh et al. | |
| 2022/0073342 A1 | 3/2022 | Ho et al. | |
| 2022/0267141 A1 | 8/2022 | Chen et al. | |
| 2022/0272459 A1 | 8/2022 | Chen et al. | |
| 2022/0332568 A1 | 10/2022 | Barsukou | |
| 2023/0007405 A1 | 1/2023 | Qian et al. | |
| 2023/0011561 A1 | 1/2023 | Qian et al. | |
| 2023/0012046 A1 | 1/2023 | Qian et al. | |
| 2023/0039743 A1 | 2/2023 | Hui et al. | |
| 2023/0104257 A1 | 4/2023 | Barsukou et al. | |
| 2023/0105699 A1 | 4/2023 | Chen et al. | |
| 2023/0127983 A1 | 4/2023 | Chen et al. | |
| 2023/0234837 A1 | 7/2023 | Chen et al. | |
| 2023/0239641 A1 | 7/2023 | Chen et al. | |
| 2023/0303387 A1 | 9/2023 | Barsukou | |

OTHER PUBLICATIONS

Chen et al., "Edge-released, piezoelectric MEMS acoustic transducers in array configuration," J. Micromech. Microeng. 22 (2012) 025005, pp. 1-9.
Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.
Je et al., "In situ tuning of a MEMS microphone using electrodeposited nanostructures," Journal of Micromechanics and Microengineering, 19 (2009) 035015, pp. 1-8.
Je et al., "MEMS Capacitive Microphone with Dual-Anchored Membrane", Proceedings 2017, 1, 342; Aug. 9, 2017.
Knisely et al., "Method for Controlling Stress Gradients in PVD Aluminum Nitride", Journal of Micromechanics and Microengineering, vol. 28, No. 11, 2018.
Littrell, "High Performance Piezoelectric MEMS Microphones", A dissertation submitted in partial fulfillment of the requirements for the degree of Doctor of Philosophy (Mechanical Engineering) in The University of Michigan, 2010, 111 pages.
Lo et al., "Development of a No. Back-Plate SOI MEMS Condenser Microphone," IEEE, Transducers 2015, Anchorage, Alaska, Jun. 21-25, 2015, pp. 1085-1088.
Lo et al., "Sensitivity Improvement of No-Back-Plate MEMS Microphone Using Polysilicon Trench-refilled Process," IEEE, Transducers 2017, Kaohsiung, Taiwan, Jun. 18-22, 2017, pp. 1171-1174.
Mohamad et al., "Modelling and Optimisation of a Spring-Supported Diaphragm Capacitive MEMS Microphone", Engineering, 2010, 2, 762-770.
Peña-García et al., "Design and Modeling of a MEMS Dual-Backplate Capacitive Microphone with Spring-Supported Diaphragm for Mobile Device Applications," Sensors (2018), 18, 3545, 30 pages.
Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.
Segovia-Fernandez et al., "Monolithic Piezoelectric Aluminum Nitride MEMS-CMOS Microphone", IEEE (2017), Transducers 2017, Kaohsiung, Taiwan, Jun. 18-22, 2017, pp. 414-417.
Shah et al., "Design Approaches of MEMS Microphones for Enhanced Performance", Hindawi, Journal of Sensors, vol. 2019, Article ID 9294528, Mar. 6, 2019, 26 pages.
Udvardi et al., Spiral-Shaped Piezoelectric MEMS Cantilever Array for Fully Implantable Hearing Systems. Micromachines (2017) 8, 311, 13 pages.
Yamashita et al., "Diaphragm deflection control of piezoelectric ultrasonic microsensors for sensitivity improvement", Sensors and Actuators A 139 (2007), pp. 118-123.
Yan et al., "Corrugated Diaphragm for Piezoelectric Microphone", IEEE, 1996, pp. 503-506.
Williams et al., "An AlN MEMS Piezoelectric Microphone for Aeroacoustic Applications", Journal of Microelectromechanical Systems, vol. 21, No. 2, Apr. 2012, pp. 270-283.

* cited by examiner

PIEZOELECTRIC MICROELECTROMECHANICAL SYSTEM MICROPHONE WITH OPTIMIZED OUTPUT CAPACITANCE

CROSS-REFERENCE TO RELATED APPLICATIONS

This application claims priority under 35 U.S.C. § 119(e) to U.S. Provisional Patent Application Ser. No. 63/241,131, titled "PIEZOELECTRIC MICROELECTROMECHANICAL SYSTEM MICROPHONE WITH OPTIMIZED OUTPUT CAPACITANCE," filed Sep. 7, 2021, the entire content of which is incorporated herein by reference for all purposes.

BACKGROUND

Technical Field

Embodiments disclosed herein relate to piezoelectric microelectromechanical system microphones and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. PMMs requires no bias voltage for operation, therefore, they provide lower power consumption than capacitive MEMS microphones. The single membrane structure of PMMs enable them to generally provide more reliable performance than capacitive MEMS microphones in harsh environments. Existing PMMs are typically based on either cantilever MEMS structures or diaphragm MEMS structures. PMMs with cantilever structures may suffer from poor low frequency roll off control as the gap between cantilevers varies when cantilevers deflect due to residual stress. PMMs with cantilever structures may also have lower sensitivity than PMMs with diaphragm structures as they collect piezoelectric charges only at the edge. PMMs with diaphragm structures do not suffer from low frequency roll off variations. Additionally, they are able to collect more piezoelectric charges both at the edge and the center of diaphragm, and may thus provide higher output energy than PMMS with cantilever structures.

SUMMARY

In accordance with one aspect, there is provided a piezoelectric microelectromechanical system microphone. The piezoelectric microelectromechanical system microphone comprises a support substrate, a diaphragm including a piezoelectric material attached to the support substrate and configured to deform and generate an electrical potential responsive to impingement of sound waves on the diaphragm, upper electrodes disposed on an upper surface of the diaphragm, the upper electrodes including upper inner electrodes and upper outer electrodes, lower electrodes disposed on a lower surface of the diaphragm, the lower electrodes including lower inner electrodes and lower outer electrodes, the diaphragm being divided into a plurality of sectors, a first of the plurality of sectors including an inner and an outer upper electrode physically disconnected from an inner and an outer upper electrode on a second sector adjacent to the first sector, and an inner and an outer lower electrode physically disconnected from an inner and an outer lower electrode on the second sector, a first conductive via extending between and electrically coupling the upper and lower inner electrodes of the first sector and in electrical communication with a first bond pad, and a second conductive via extending between and electrically coupling the upper and lower outer electrodes of the second sector and in electrical communication with a second bond pad.

In some embodiments, the diaphragm includes an upper layer of the piezoelectric material, a lower layer of the piezoelectric material, and inner and outer middle electrodes disposed at an interface between the upper and lower layers of piezoelectric material.

In some embodiments, the inner and outer middle electrodes in each of the plurality of sectors are electrically connected.

In some embodiments, the inner and outer middle electrodes in each of the plurality of sectors are electrically floating.

In some embodiments, the piezoelectric microelectromechanical system microphone further comprises a third conductive via extending between and electrically connecting the upper and lower outer electrodes of the first sector.

In some embodiments, the piezoelectric microelectromechanical system microphone further comprises a fourth conductive via extending between and electrically connecting the upper and lower inner electrodes of the second sector.

In some embodiments, the upper and lower outer electrodes of the first sector are electrically connected to the upper and lower inner electrodes of the second sector.

In some embodiments, the upper and lower outer electrodes of the first sector are electrically connected to upper and lower inner electrodes of the third sector adjacent to the first sector.

In some embodiments, the upper and lower outer electrodes of the first sector are electrically unconnected.

In some embodiments, the upper and lower inner electrodes of the second sector are electrically unconnected.

In some embodiments, the piezoelectric microelectromechanical system microphone further comprises an electrical conductor extending between and electrically coupling the upper outer electrode of the first sector to the upper inner electrode of the second sector.

In some embodiments, the piezoelectric microelectromechanical system microphone further comprises an electrical conductor extending between and electrically coupling the lower outer electrode of the first sector to the lower inner electrode of the second sector.

In some embodiments, the piezoelectric microelectromechanical system microphone further comprises a third sector adjacent to the first sector and including upper and lower inner electrodes that are electrically unconnected.

In some embodiments, the piezoelectric microelectromechanical system microphone further comprises electrical conductor extending between and electrically coupling the upper outer electrode of the first sector to the upper inner electrode of the third sector.

In some embodiments, the piezoelectric microelectromechanical system microphone further comprises an electrical conductor extending between and electrically coupling the lower outer electrode of the first sector to the lower inner electrode of the third sector.

In some embodiments, the diaphragm is circular.

In some embodiments, the piezoelectric microelectromechanical system microphone is included in an electronics device module.

The electronic device module may be included in an electronic device.

The electronic device module may be included in a telephone.

In some embodiments, there is provided a method of forming a piezoelectric microelectromechanical system microphone as described above.

In some embodiments, the method comprises selecting areas of the upper and lower electrodes and a number of the plurality of sectors to provide the piezoelectric microelectromechanical system microphone with a desired output capacitance. The desired output capacitance may match a capacitance of circuitry electrically connected to the piezoelectric microelectromechanical system microphone.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
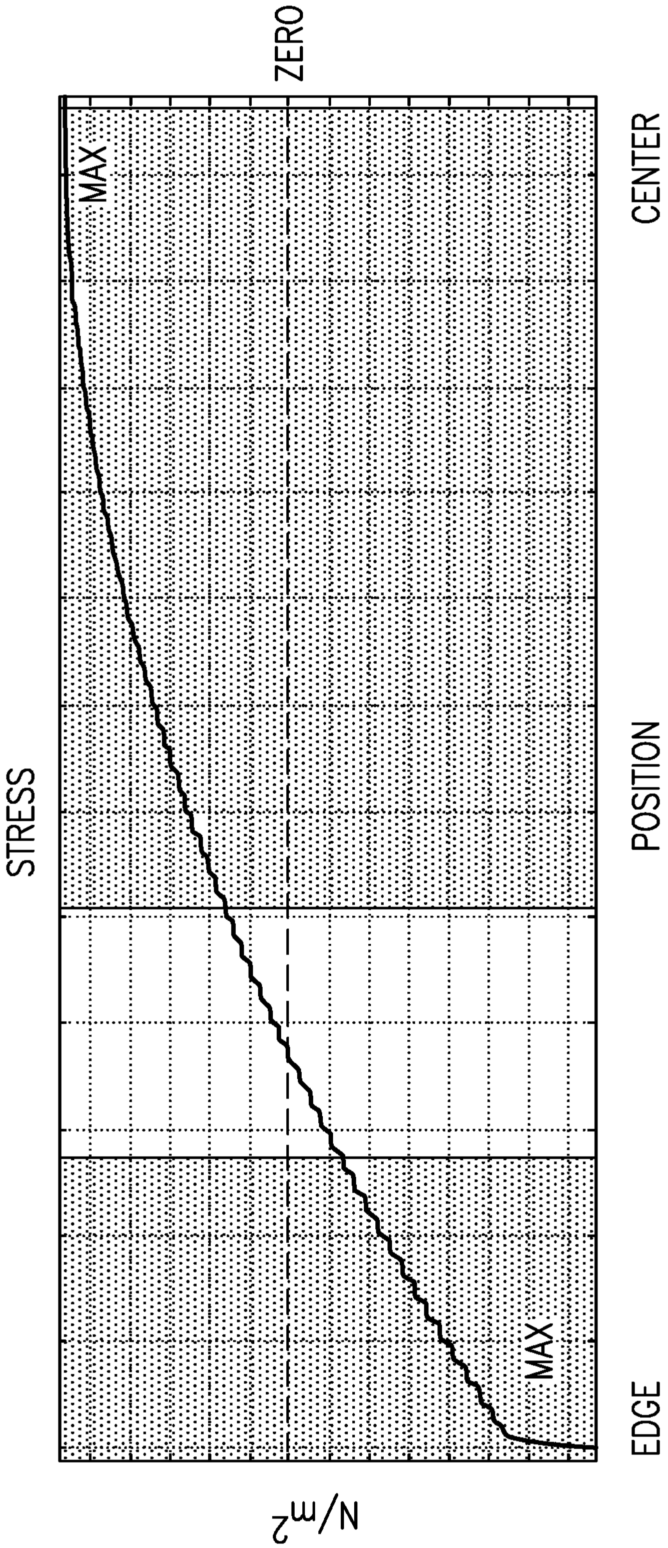
FIG. 1 is a chart of stress versus position exhibited in a diaphragm PMM subjected to acoustic pressure.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Disclosed herein are aspects and embodiments of a piezoelectric microelectromechanical system (MEMS) microphone (PMM) that is based on a diaphragm structure (either circular, rectangular, or polygon shapes). The diaphragm structure is fully clamped to a support substrate all around the perimeter of the diaphragm, forming an anchor for the diaphragm on the support substrate. The structures and methods disclosed herein are also applicable to PMMs having other diaphragm structures with different anchors such as spring anchors or corrugated anchors.

Embodiments of a diaphragm PMM as disclosed herein may include a diaphragm having one, two, or multiple piezoelectric layers. In a diaphragm PMM including a diaphragm with two piezoelectric layers, conductive layers forming electrodes for the PMM may be deposited on top and the bottom of the diaphragm, as well as between the two piezoelectric layers, forming a bimorph diaphragm structure.

Piezoelectric diaphragm structures utilized in diaphragm PMMs typically generate maximum stresses and piezoelectric charges in the center and near the edge of the diaphragm anchor. The charges generated in the center and edge of the diaphragm structure have opposite polarities. Additionally, piezoelectric diaphragm structures typically generate charges with opposite charge polarities at the top and the bottom surfaces in the same radial locations of the diaphragm.

To achieve an optimal output capacitance to optimize the signal to noise ratio (SNR) of a diaphragm PMM as disclosed herein, the diaphragm may be equally divided into N sectors ($N \geq 2$) such that the inner electrodes and outer electrodes of the PMM are all divided into N sectors.

As the diaphragm is equally divided into N sectors, all inner electrodes may have the same output voltage and capacitance, and all outer electrodes may have the same output voltage and capacitance. The output voltage and capacitance might be the same or different between inner and outer electrodes in an individual sector.

In some embodiments, dividing the diaphragm of a diaphragm PMM into N sectors results in the formation of 2N pieces of electrodes (each sector has an inner electrode and an outer electrode), or 3N pieces of electrodes if inner and outer middle electrodes are present in the diaphragm structure. Each piece of electrode generates two capacitors, one in the top AlN layer formed from an upper electrode and a middle electrode, and one in the bottom AlN layer formed from a lower electrode and/or a middle electrode. The corresponding top and the bottom outer electrodes have the same polarities relative to the middle electrode. However, the inner and outer electrodes have the opposite voltage polarities.

For the top AlN layer, all electrodes may be connected in a way to adjust the output capacitance to a desired value. The middle inner electrodes may be connected to the middle outer electrodes in each respective sector. Two adjacent sectors may be connected end-to-end wherein the inner electrode of one sector is connected to the outer electrode of a next sector. Therefore, 2N electrodes can be connected in series to provide a higher output voltage and a lower output capacitance.

Since there is also a bottom AlN layer, more output energy (voltage or/and capacitance) could be added to the top AlN layer. The corresponding top and bottom electrodes may be connected together to double the output capacitance without changing the output voltage, therefore doubling the output energy.

N can be selected according to the desired output capacitance, without affecting the output energy.

The diaphragm may also be divided into unequally sized sectors.

The inner electrodes are placed in the center of diaphragm and the outer electrodes are placed near the anchor. Electrodes are placed in the bottom, middle, and top of the PMM piezoelectric diaphragm layer. The size of each electrode may be selected to collect the maximum output energy ($E=0.5*C*V^2$).

To obtain the best performance of a PMM in terms of sensitivity and signal to noise ratio (SNR), the electrodes of the PMM may be designed to collect the maximum output energy. The SNR of the PMM depends not only on the maximum output energy of PMM, but also on the degree of matching of capacitance between the PMM and the circuitry to which the PMM is electrically coupled. In many prior art PMM designs the output capacitance of diaphragm-type PMM is fixed by the total electrode area. Aspects and embodiments disclosed herein provide a solution to design a PMM with a desired output capacitance.

Aspects and embodiments disclosed herein involve engineering of the structure, for example, electrode size and shape, and interconnections between electrodes of a diaphragm-based PMM to improve the sensitivity and/or to improve SNR by improving capacitive matching of the electrodes of the PMM with circuitry to which the electrodes may be electrically coupled.

Figure 2A:
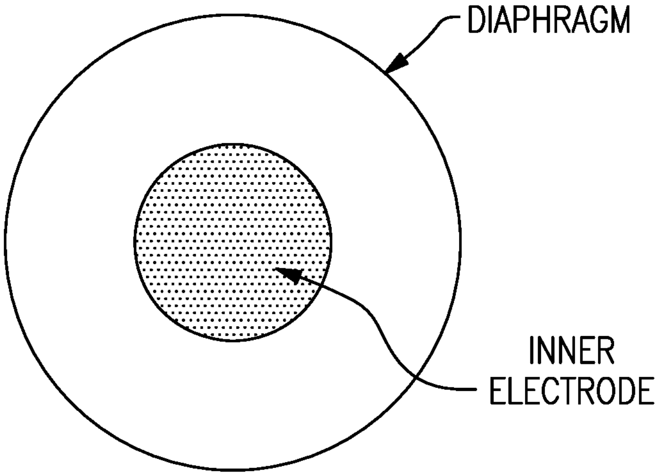
FIG. 2A is a simplified plan view of the diaphragm and electrode structure of a diaphragm PMM having an inner electrode.
Figure 2B:
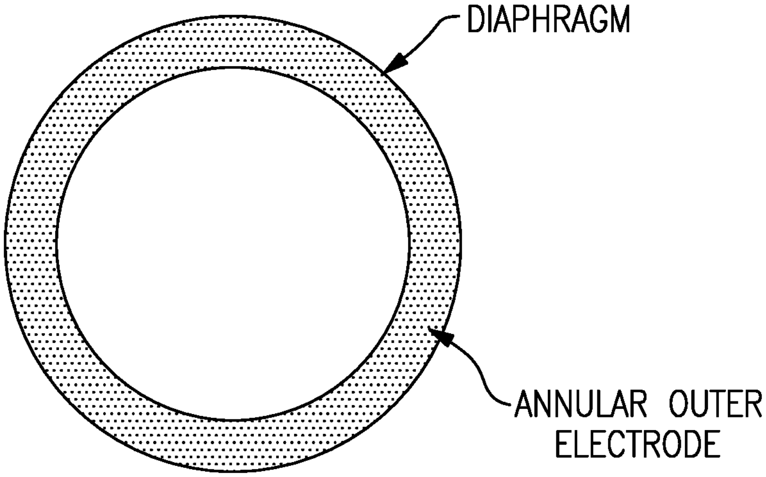
FIG. 2B is a simplified plan view of the diaphragm and electrode structure of a diaphragm PMM having an outer annular electrode.

Responsive to deflection by acoustic pressure, diaphragm PMM structures generate piezoelectric charges at the top and the bottom surfaces of the piezoelectric membrane with opposite charge polarities. Diaphragm PMMs generate maximum stress and piezoelectric charges in the center and near the edge or anchor of the diaphragm. The charges generated in the center and edge of the diaphragm PMM have opposite polarities. FIG. 1 is a chart of results of simulated stress from the edge to the center of one example of a circular diaphragm PMM at a given acoustic pressure. Since the greatest stress, and greatest associated charge induced in the piezoelectric material of the diaphragm occurs in the center and near the edge of the diaphragm anchor, diaphragm PMMs may include electrodes located in the center region (FIG. 2A, inner electrode), edge region (FIG. 2B, annular outer electrode), or both (FIG. 2C), or in some instances over the entire surface of the diaphragm (FIG. 2D, full surface electrode) to collect the greatest amount of charge and provide the greatest sensitivity.

Figure 3A:
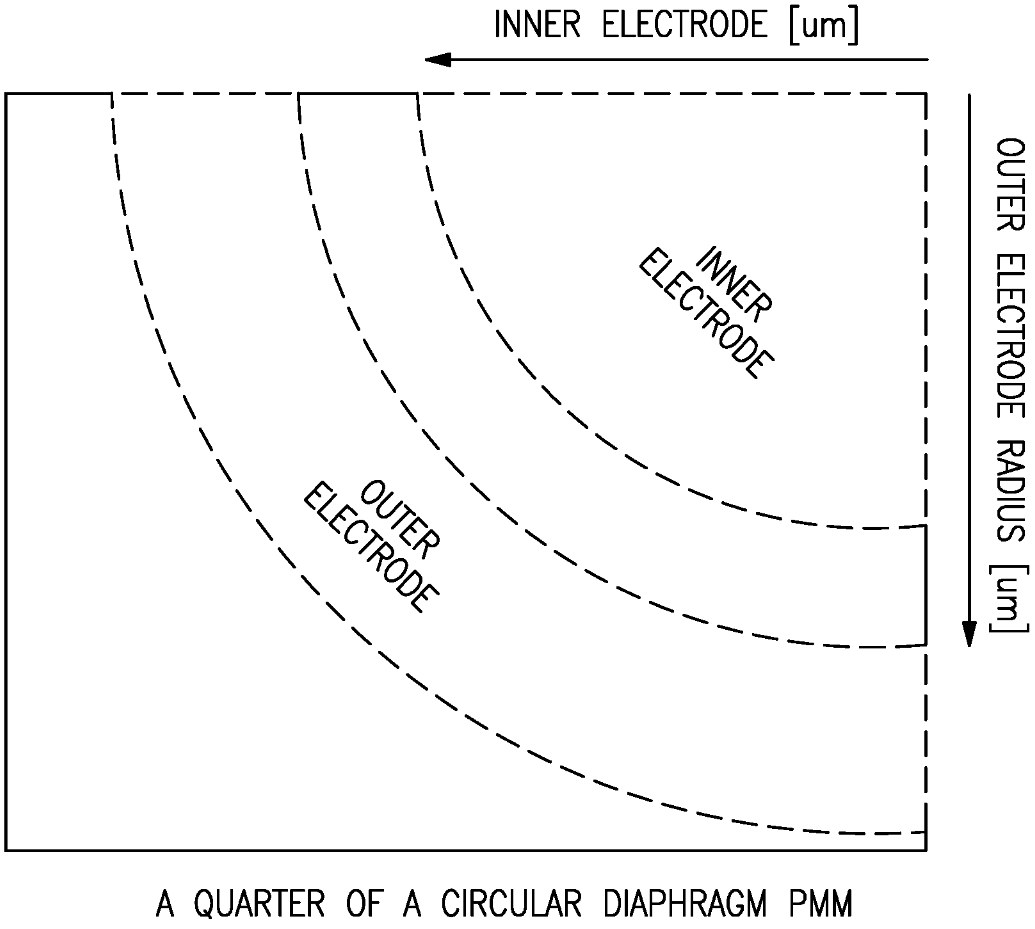
FIG. 3A illustrates how the radii of electrodes of a diaphragm PMM as disclosed herein are defined.
Figure 3B:
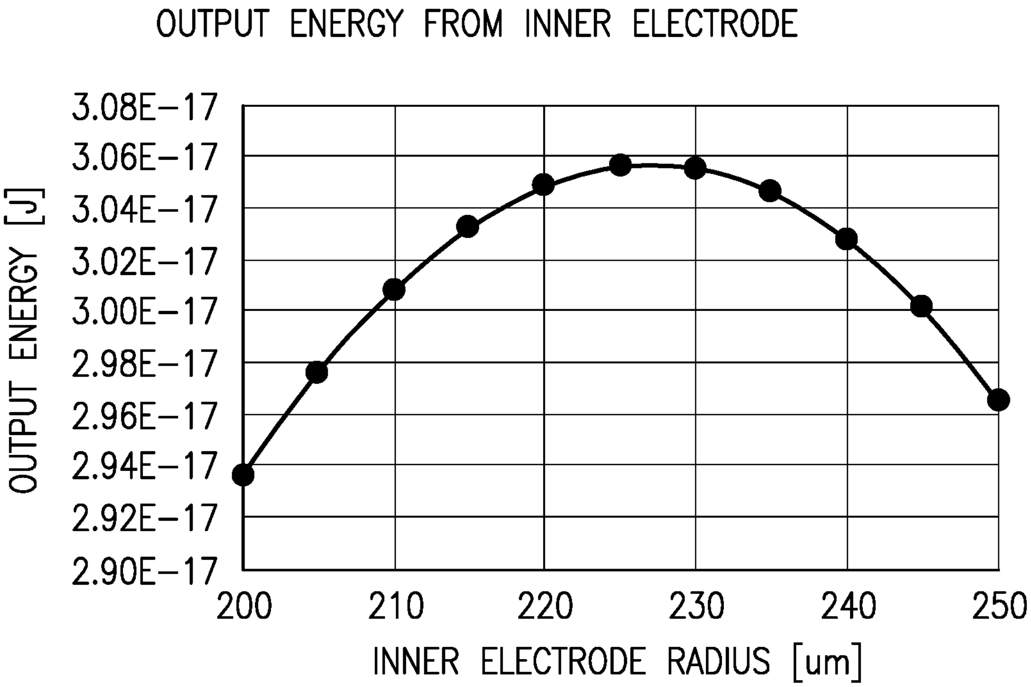
FIG. 3B is a chart of output energy versus radius for an inner electrode of an example of a circular diaphragm PMM.
Figure 3C:
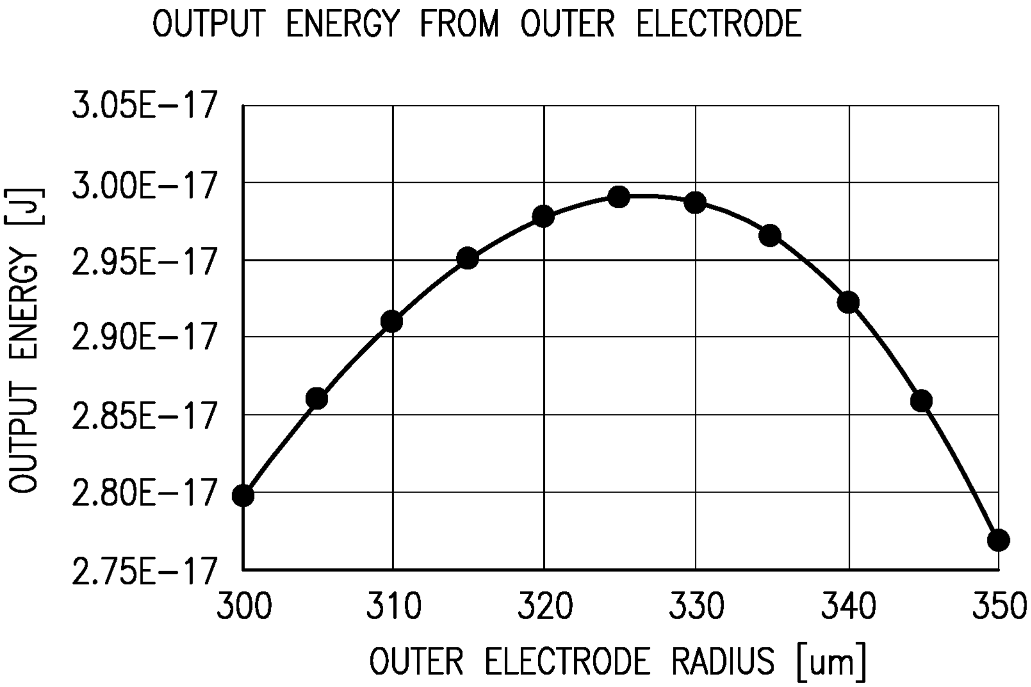
FIG. 3C is a chart of output energy versus radius for an outer electrode of an example of a circular diaphragm PMM.

The size of an inner electrode or an outer electrode of a diaphragm PMM will affect the amount of output energy, and thus sensitivity, that the inner or outer electrode may generate responsive to application of a given amount of acoustic pressure. In one simulation of output energy as a function of electrode size for a circular diaphragm PMM with a radius of 400 μm having both a central inner electrode and an annular outer electrode, where electrode size was measured as indicated in FIG. 3A, output energy as a function of electrode size was simulated. The results of this simulation are presented in FIGS. 3B and 3C. The maximum achievable output energy for the inner electrode was reached at an electrode radius of 225 μm. The maximum achievable output energy for the outer electrode was reached at an electrode radius of 325 μm. These results show that it is not necessarily the largest electrode that will produce the greatest amount of output energy. Rather the radii of the electrodes may be set at particular non-maximum lengths to achieve a desired output energy and sensitivity response.

Figure 4:
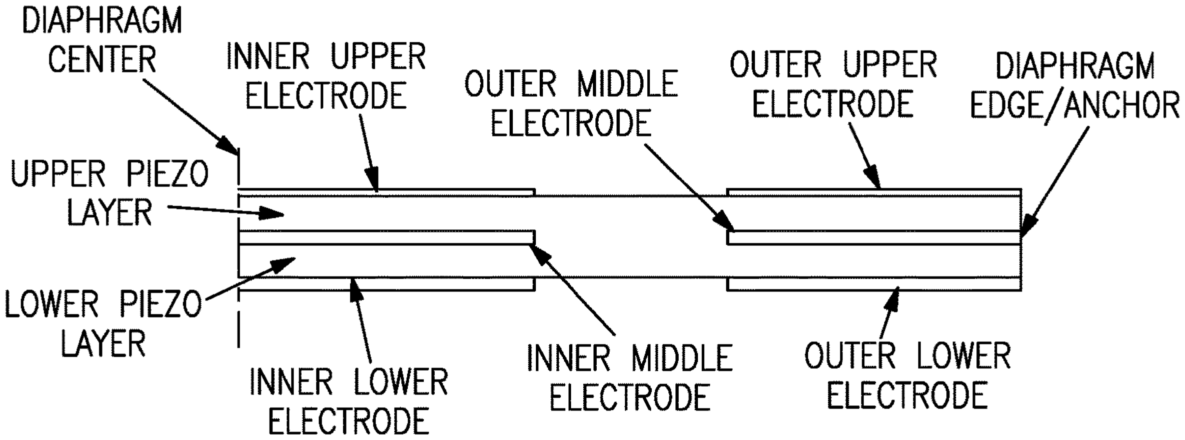
FIG. 4 illustrates the arrangement of different electrodes in a piezoelectric diaphragm of a diaphragm PMM as disclosed herein.

In some embodiments, a diaphragm PMM may be formed of two or more layers of piezoelectric material with inner and outer electrodes on top of the upper piezoelectric layer (referred to herein as "upper electrodes"), on the bottom of the lower piezoelectric layer (referred to herein as "lower electrodes"), and at an interface between the two piezoelectric layers (referred to herein as "middle electrodes"), for example, as illustrated in cross-sectional view in FIG. 4.

Figure 5:
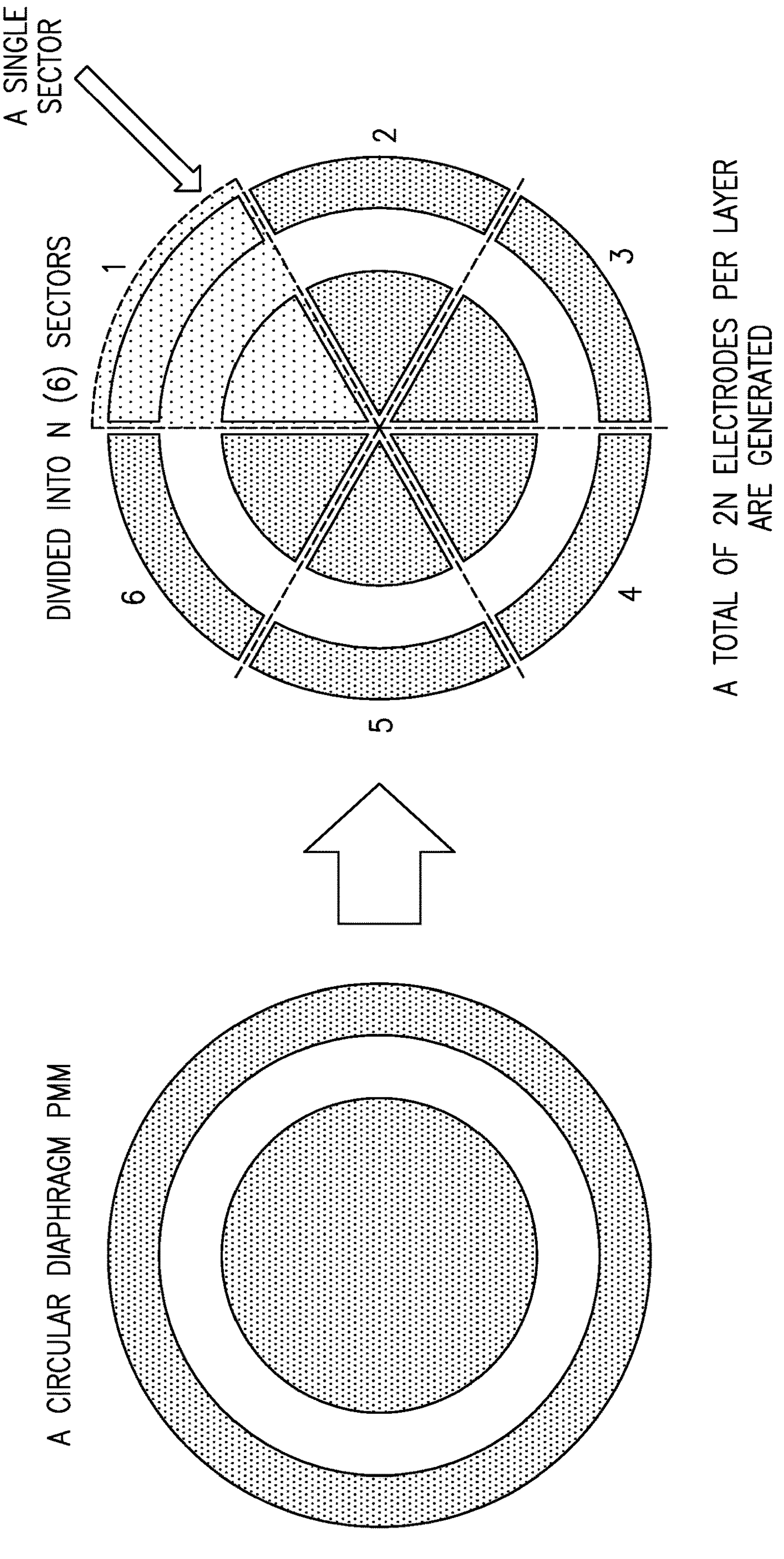
FIG. 5 illustrates the concept of breaking a circular diaphragm PMM into a plurality of sectors.
Figure 6:
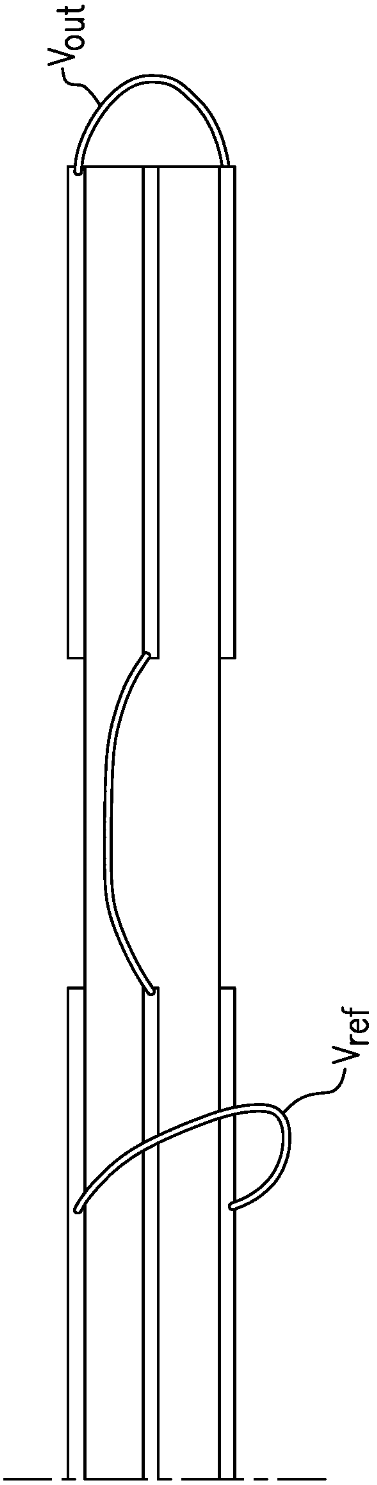
FIG. 6 illustrates electrical connections between electrodes within a single sector of a diaphragm PMM as disclosed herein.

To achieve a desired output capacitance of a diaphragm PMM including inner and outer electrodes, the diaphragm may be divided into a number of different sectors with inner electrodes in adjacent sectors physically separated from each other and with outer electrodes in adjacent sectors physically separated from each other as illustrated in FIG. 5. As illustrated in FIG. 6, in each sector, the upper and lower inner electrodes may be electrically connected to one another, for example, with a conductive via, and output a reference voltage $V_{ref}$. The upper and lower outer electrodes may be electrically connected to one another, for example, with a conductive via, and output a voltage $V_{out}$. The inner and outer middle electrodes may be electrically connected and left electrically floating.

Figure 7A:
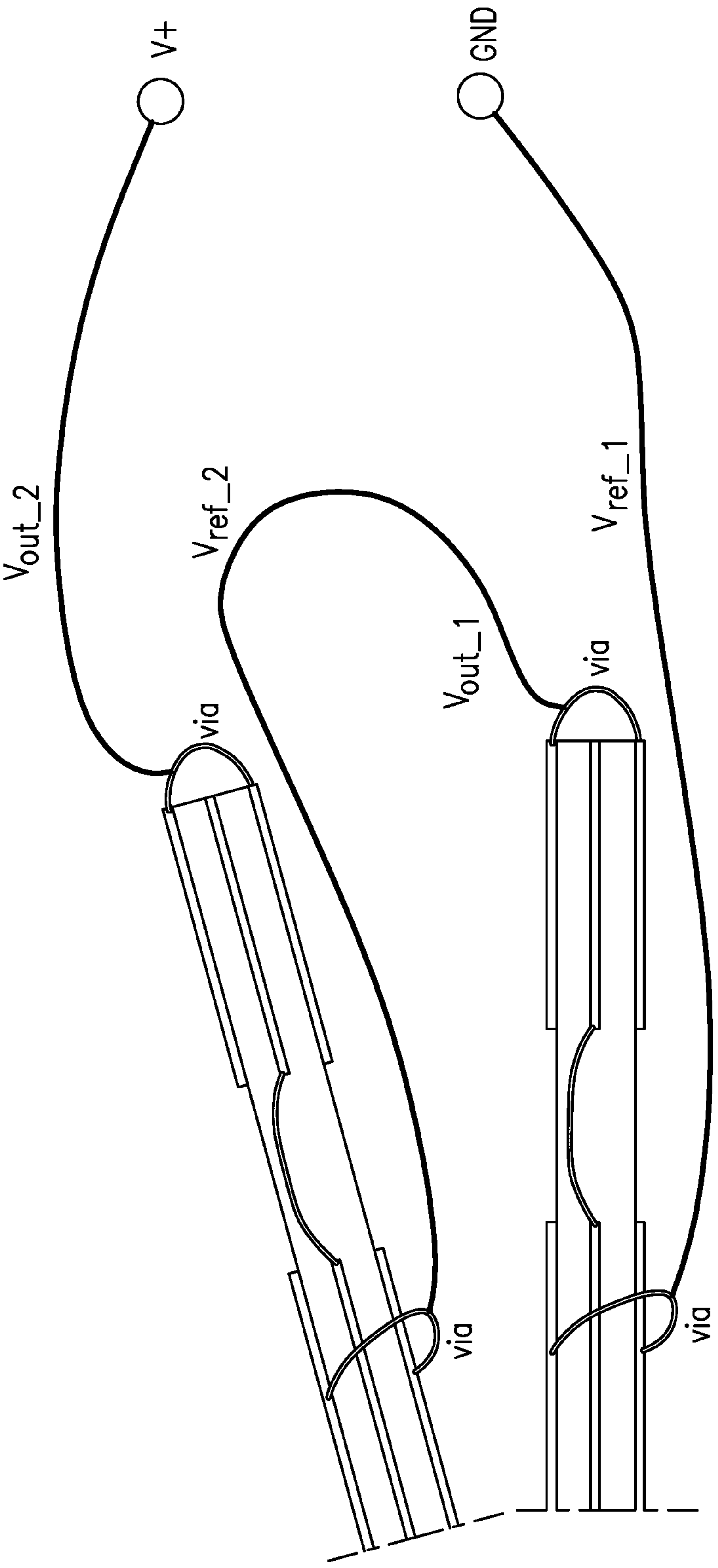
FIG. 7A illustrates electrical connections between electrodes within two sectors of a diaphragm PMM as disclosed herein.
Figure 7B:
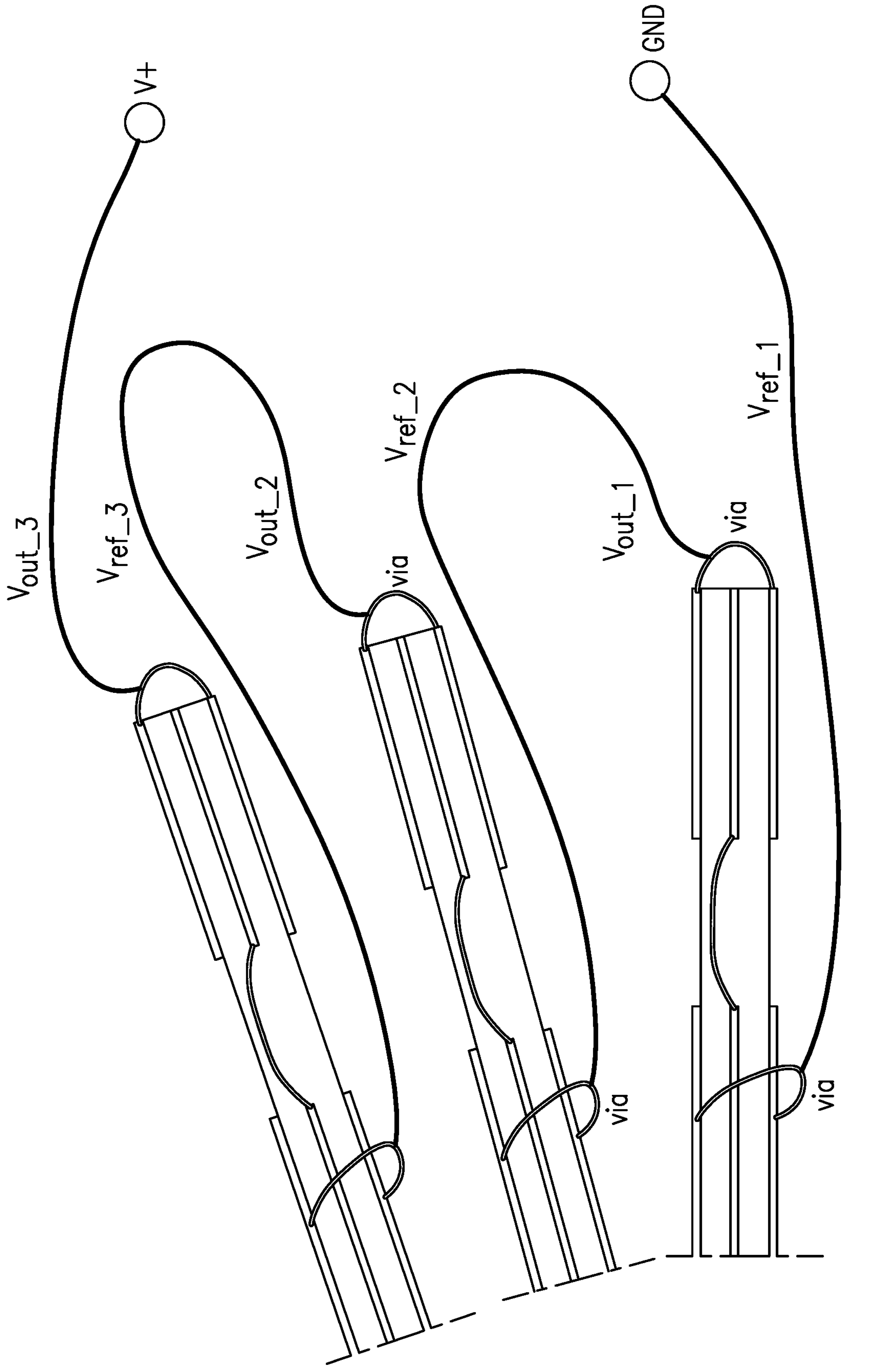
FIG. 7B illustrates electrical connections between electrodes within three sectors of a diaphragm PMM as disclosed herein.

The electrodes of adjacent sectors may be electrically connected as illustrated in FIG. 7A. The outer upper and lower electrodes of a first sector may be electrically connected to the inner upper and lower electrodes of a second sector. The voltage output $V_{out\_1}$ of the first sector becomes the reference voltage $V_{ref\_2}$ of the second sector. The inner upper and lower electrodes of the first sector may be connected to a first bond pad for the PMM and the reference voltage $V_{ref\_1}$ of the first sector may be used as the ground connection for the PMM. The outer upper and lower electrodes of the second sector may be connected to a second bond pad for the PMM and the output voltage $V_{out\_2}$ of the second sector may be used as signal (V+) output for the PMM. This connection methodology is referred to herein as a series connection methodology and may be extended to as many sectors as are present in the PMM. FIG. 7B illustrates, for example, connections between the sectors of a three-sector PMM. In a diaphragm PMM having N sectors, the N sectors can be connected to provide an output voltage of $N*V_0$ and an output capacitance of $C_0/N$, assuming $V_0$ and $C_0$ are the output voltage and output capacitance of a single sector including an inner electrode and an outer electrode.

Figure 7C:
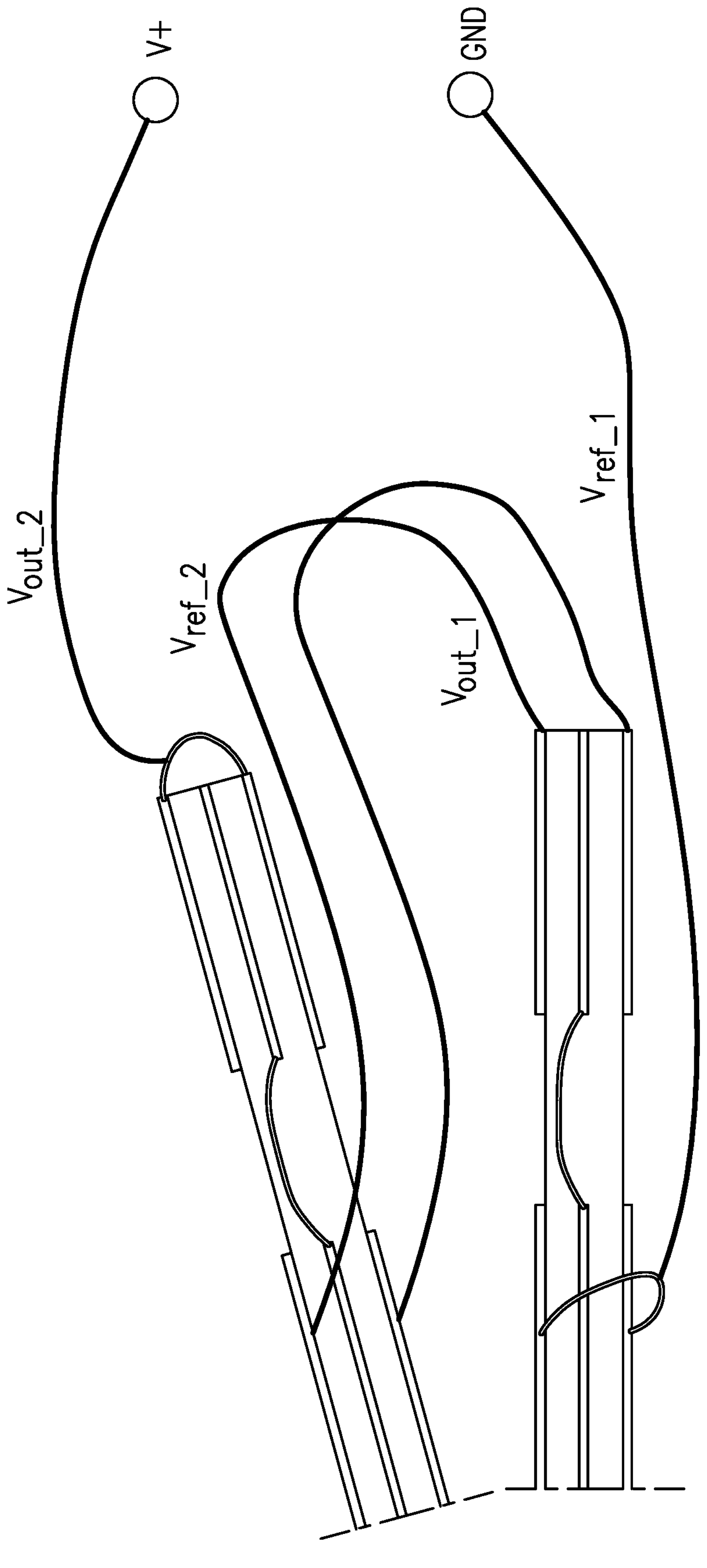
FIG. 7C illustrates an alternative configuration of electrical connections between electrodes within two sectors of a diaphragm PMM as disclosed herein.

An alternate electrode connection methodology, referred to herein as a parallel connection methodology, illustrated in FIG. 7C, includes electrically connecting the upper outer electrode of a first sector to the upper inner electrode of a second adjacent sector and electrically connecting the lower outer electrode of the first sector to the upper inner electrode of the second adjacent sector. The upper and lower inner electrodes of the first sector are electrically connected. for example, with a conductive via and connected to the ground terminal of the PMM. The upper and lower outer electrodes of the second sector are electrically connected, for example, with a conductive via, and coupled to the signal (V+) output pad of the PMM. The upper and lower outer electrodes of the first sector are not directly electrically connected to one another. The upper and lower inner electrodes of the second sector are not directly electrically connected to one another. In a similar manner as the electrode connection methodology of FIG. 7A could be extended to as many sectors that may be included in the PMM, so may the parallel connection methodology of FIG. 7C.

Figure 2C:
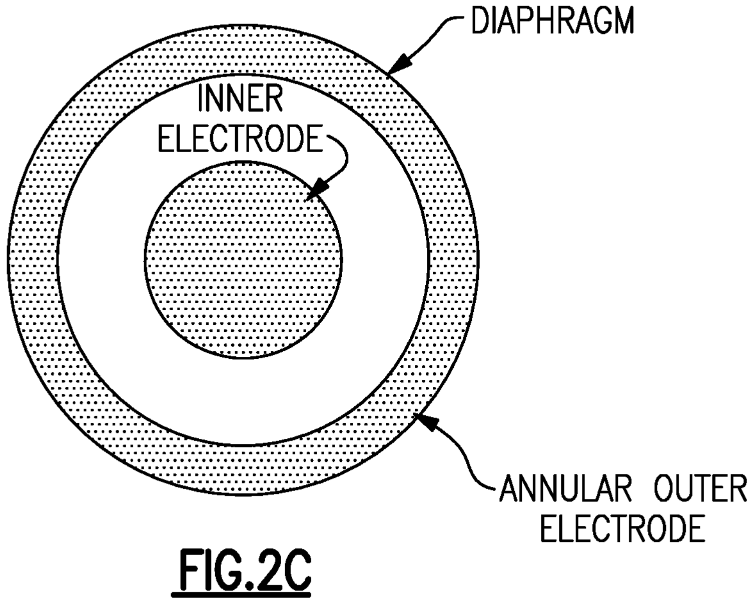
FIG. 2C is a simplified plan view of the diaphragm and electrode structure of a diaphragm PMM having both an inner electrode and an outer annular electrode.
Figure 2D:
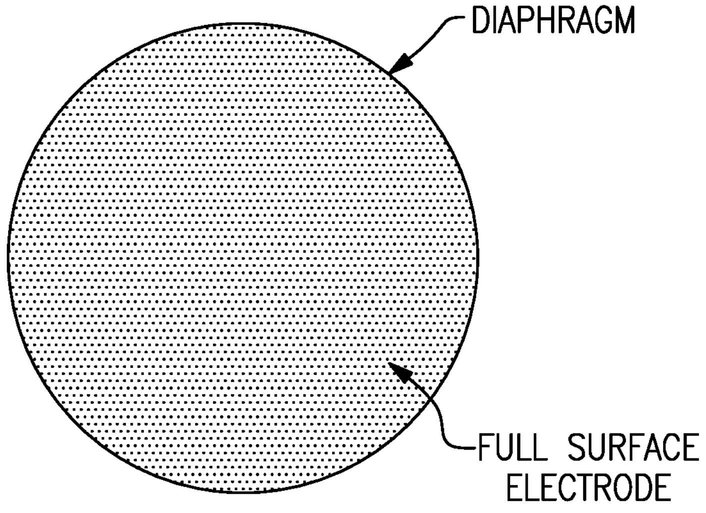
FIG. 2D is a simplified plan view of the diaphragm and electrode structure of a diaphragm PMM having full surface electrode.
Figure 8A:
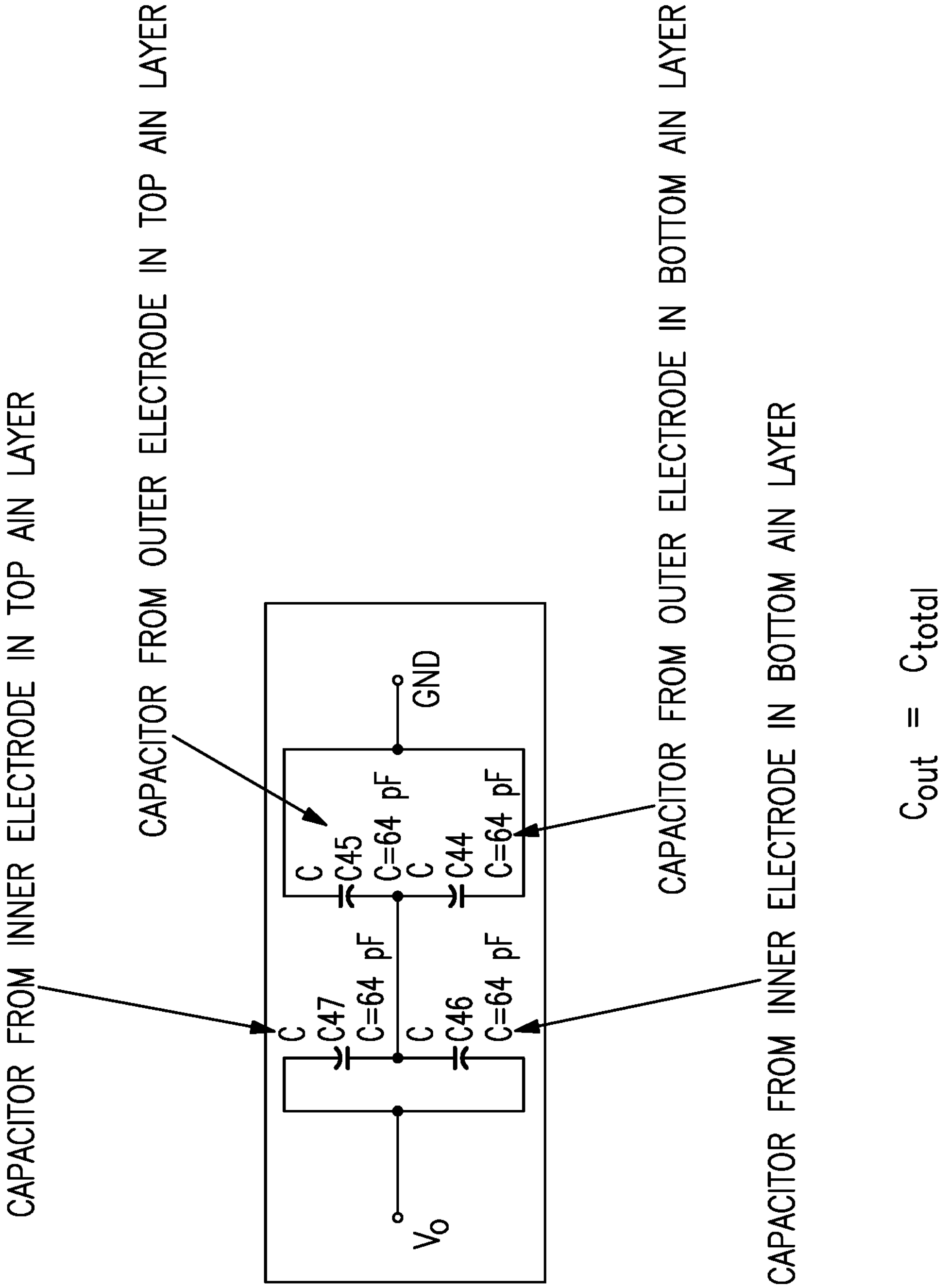
FIG. 8A illustrates an equivalent circuit diagram of a diaphragm PMM with inner and outer electrodes and a single sector.
Figure 8B:
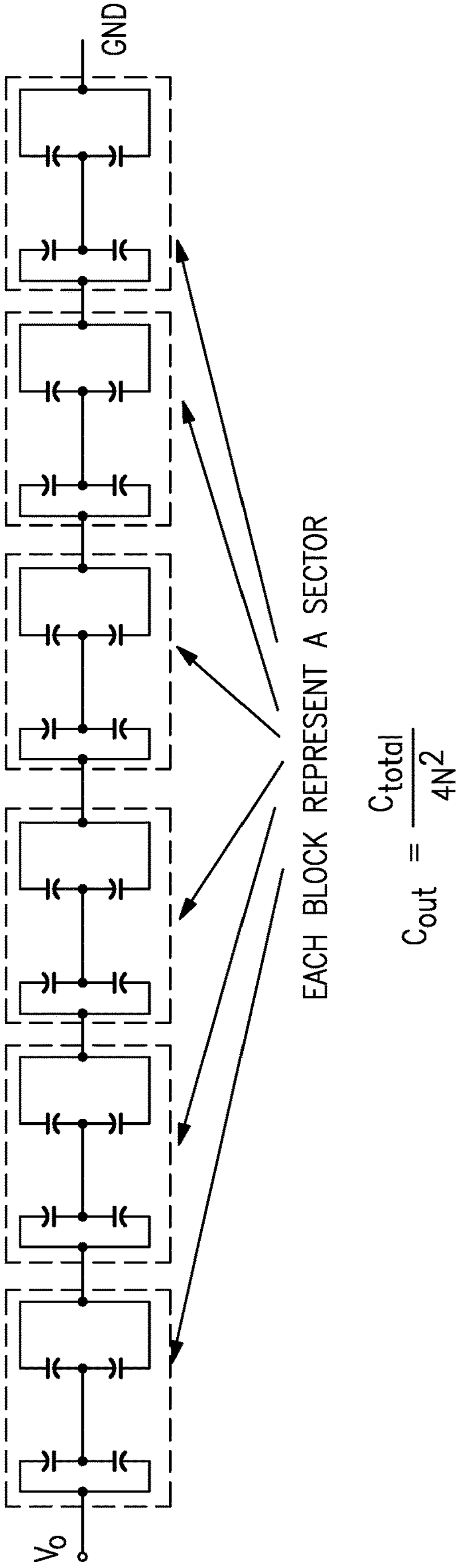
FIG. 8B illustrates an equivalent circuit diagram of a diaphragm PMM with inner and outer electrodes and six sectors and electrical connections as illustrated in FIG. 7B.
Figure 8C:
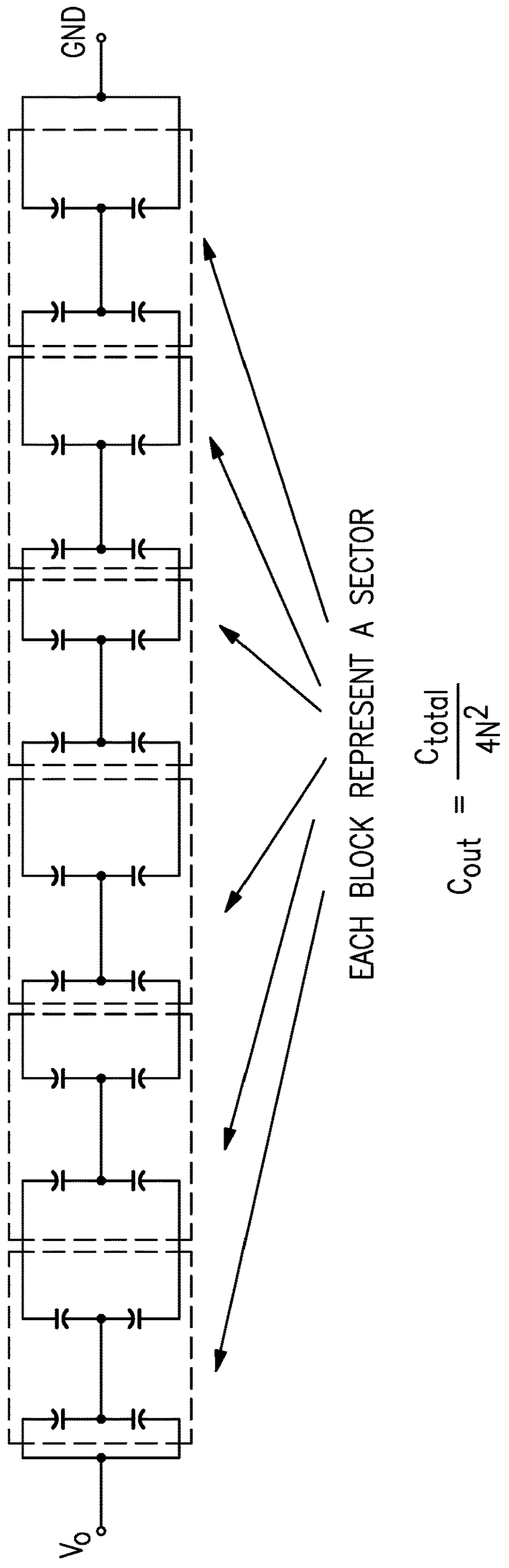
FIG. 8C illustrates an equivalent circuit diagram of a diaphragm PMM with inner and outer electrodes and six sectors and electrical connections as illustrated in FIG. 7C.

For a PMM with only a single sector and inner and outer electrodes, for example as illustrated in FIG. 2C, the total capacitance of the electrodes between the $V_0$ and GND terminal of the PMM may be given by the equivalent circuit diagram of FIG. 8A, in which the capacitance of each capacitor formed by the different electrodes of the PMM was assumed to be equal at 64 pF. This capacitance is fixed by the sizes of the electrodes: $C_{out}=C_{total}$. In contrast, in a PMM having inner and outer electrodes broken into, for example, six sectors, with the electrodes connected in series as illustrated in FIGS. 7A and 7B, the total capacitance $C_{out}$ of all electrodes between the $V_0$ and GND terminal of the PMM may be given by the equivalent circuit diagram of FIG. 8B, in which the capacitance of each capacitor formed by the different electrodes of the PMM was assumed to be equal at 64 pF. An equivalent circuit diagram for the parallel connection embodiment of FIG. 7C is similar to that for the series connection embodiment and is illustrated in FIG. 8C. In a diaphragm PMM as disclosed herein with inner and outer electrodes broken into N sectors, the total electrode capacitance $C_{out}=C_{total}/4N^2$, where $C_{total}$ would be the electrode capacitance if the PMM was not broken into sectors and the electrodes electrically connected as disclosed herein. Setting the sizes of the electrodes and breaking the PMM into sectors thus provides at least two degrees of freedom for one to manipulate to set the capacitance of a diaphragm PMM to a desired level, for example, and capacitively match a circuit to which the PMM is connected.

Figure 9A:
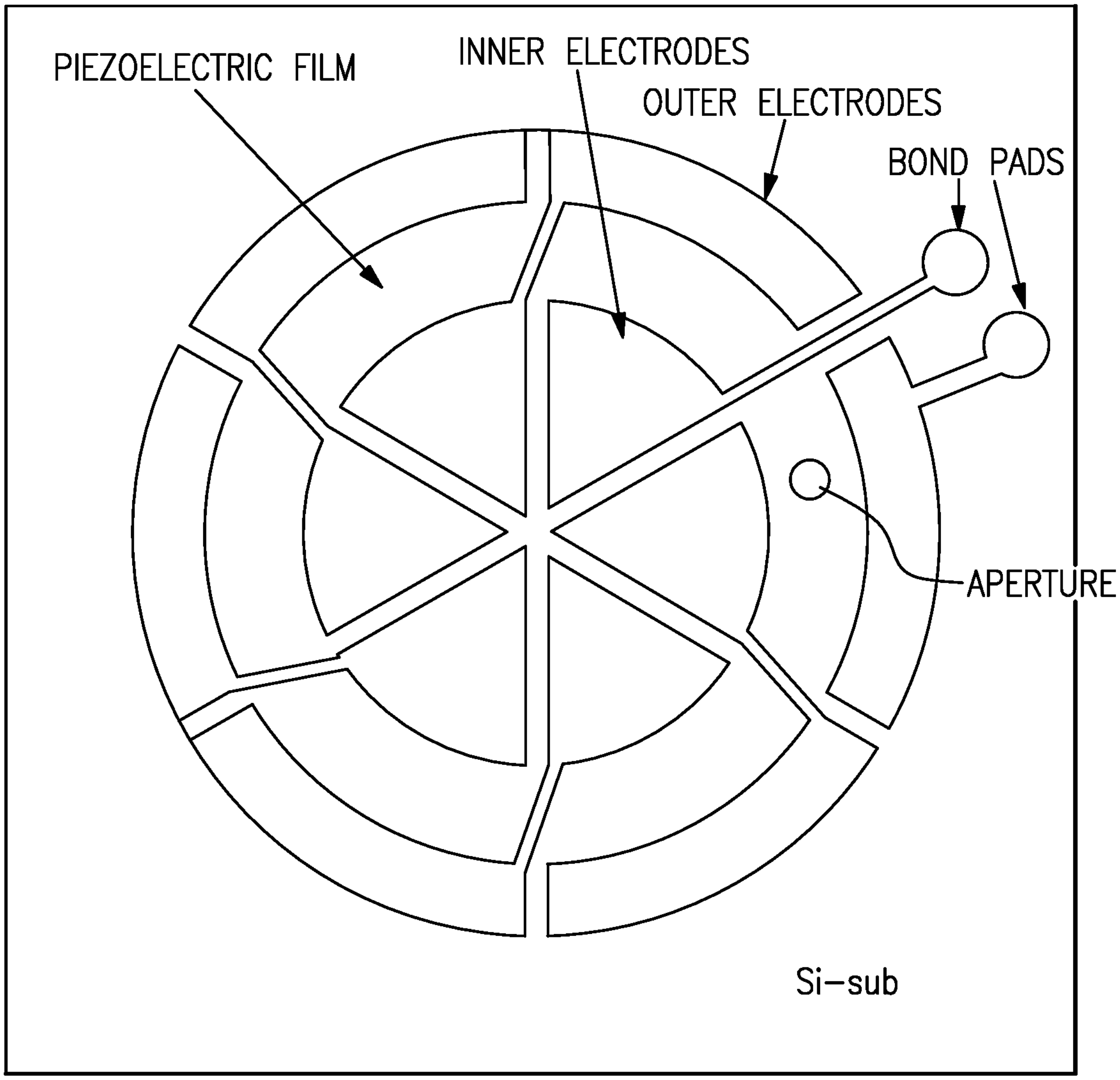
FIG. 9A is a plan view of a diaphragm PMM as disclosed herein.
Figure 9B:
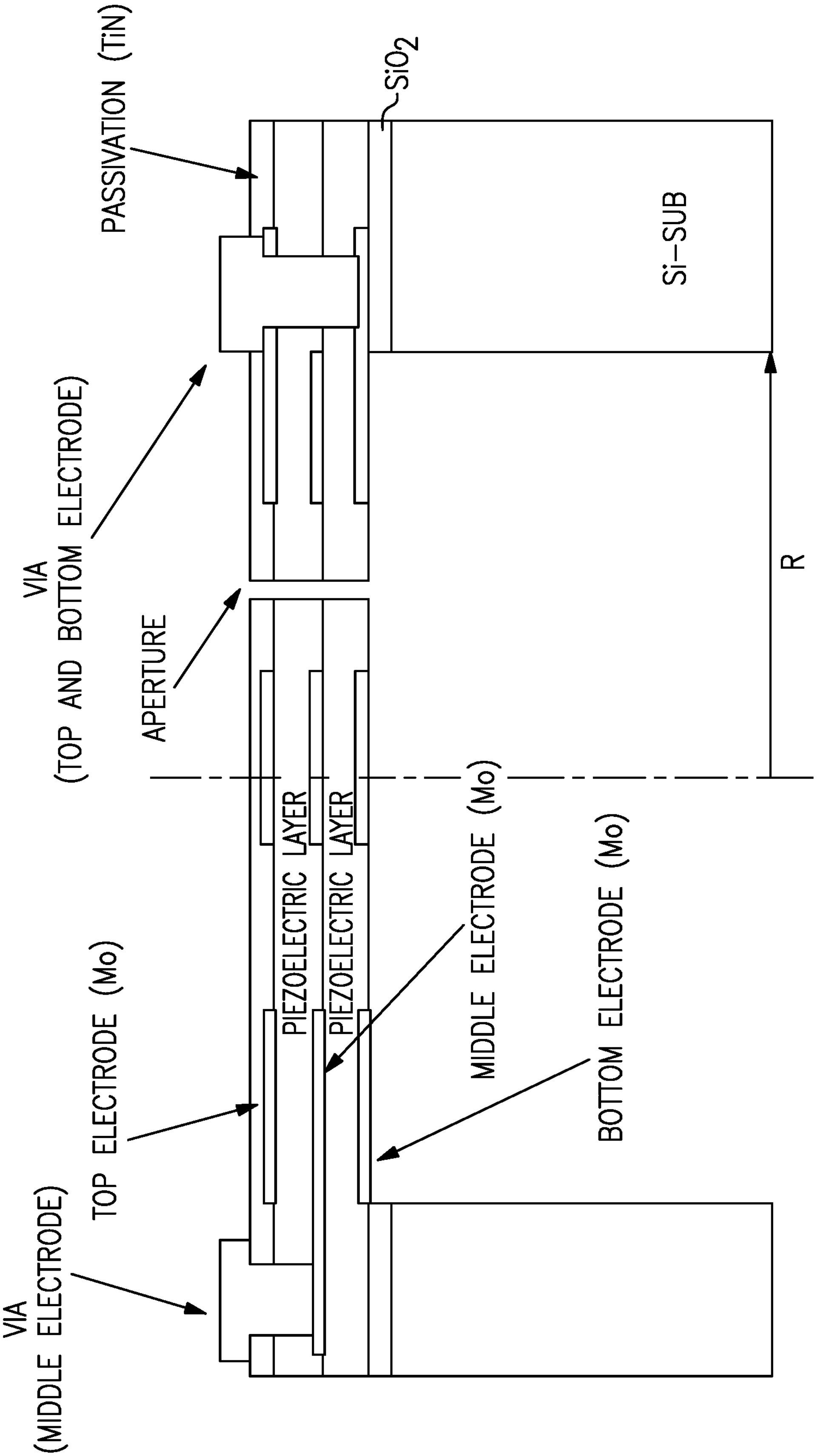
FIG. 9B is a cross-sectional view of a diaphragm PMM as disclosed herein.

In some embodiments, a PMM broken into sectors with electrodes electrically connected as disclosed herein may appear in plan view as illustrated in FIG. 9A and in cross-sectional view as illustrated in FIG. 9B. As discussed above, the diaphragm of the PMM may be formed of a piezoelectric material, for example, aluminum nitride (AlN), that generates a voltage difference across different portions of the diaphragm when the diaphragm deforms or vibrates due to the impingement of sound waves on the diaphragm. Although illustrated as circular in FIG. 9A, the diaphragm may have a circular, rectangular, or polygonal shape. In the example of FIGS. 9A and 9B, the diaphragm structure is fully clamped all around its perimeter by adhesion of the entire perimeter of the piezoelectric material of the diaphragm to a layer of $SiO_2$ disposed on a Si substrate. To improve low-frequency roll-off control ($f_{-3dB}$ control) one or more vent holes or apertures may be formed in the diaphragm structure that may be well defined by photolithography.

The diaphragm PMM of FIGS. 9A and 9B has a circular diaphragm formed of two layers of piezoelectric material, for example, AlN, that is clamped at its periphery on layers of $SiO_2$ formed on a Si substrate with a cavity defined in the substrate below the diaphragm. The circular diaphragm PMM includes a plurality of pie-piece shaped sensing/active inner electrodes disposed in the central region of the diaphragm that are segmented and separated from one another by gaps. Outer sensing/active electrodes, segmented and separated circumferentially from one another by gaps, are positioned proximate a periphery of the diaphragm and extend inward from the clamped periphery a partial of the radius of the diaphragm toward the inner electrodes. Each outer sensing electrode is directly electrically connected to a corresponding inner sensing electrode by an electrical trace or conductor segment. Open areas that are free of sensing/active electrodes are defined between the inner electrodes and outer electrodes.

The inner electrodes and outer electrodes each include top or upper electrodes disposed on top of an upper layer of piezoelectric material of the diaphragm, bottom or lower electrodes disposed on the bottom of the lower layer of piezoelectric material of the diaphragm, and middle electrodes disposed between the upper and lower layers of piezoelectric material. The multiple inner and outer electrodes may be electrically connected in series between the two bond pads as disclosed above. Vias to the middle electrode of one inner and outer electrode segment pair and to the top and bottom electrodes of an adjacent inner and outer electrode segment pair are used to provide electrical connection between the bond pads and electrodes. The electrodes are indicated as being Mo, but could alternatively be Ru or any other suitable metal, alloy, or non-metallic conductive material.

Figure 10:
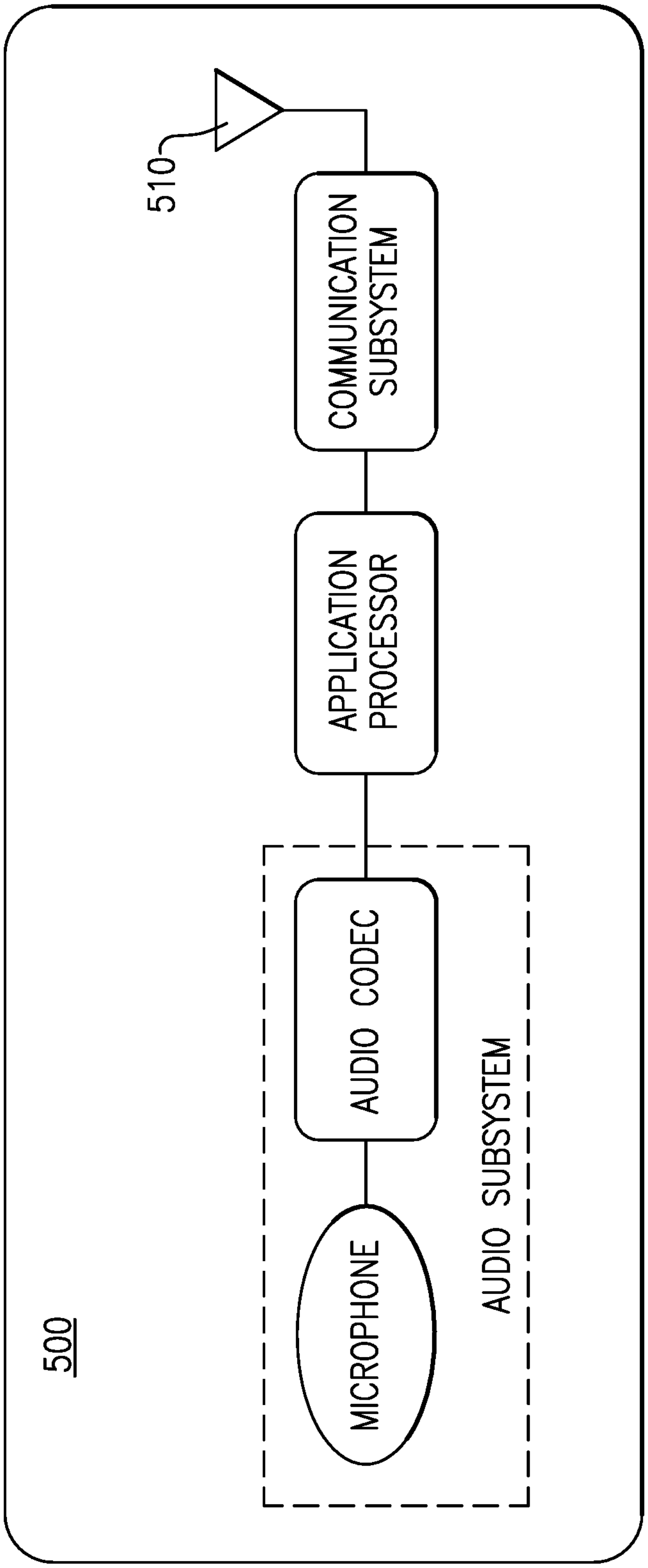
FIG. 10 is a block diagram of one example of a wireless device and that can include one or more piezoelectric MEMS microphones according to aspects of the present disclosure.

Examples of MEMS microphones as disclosed herein can be implemented in a variety of packaged modules and devices. FIG. 10 is a schematic block diagrams of an illustrative device 500 according to certain embodiments.

The wireless device 500 can be a cellular phone, smart phone, tablet, modem, communication network or any other portable or non-portable device configured for voice or data communication. The wireless device 500 can receive and transmit signals from the antenna 510.

The wireless device 500 may include one or more microphones as disclosed herein. The one or more microphones may be included in an audio subsystem including, for example, an audio codec. The audio subsystem may be in electrical communication with an application processor and communication subsystem that is in electrical communication with the antenna 510. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words “comprise,” “comprising,” “include,” “including” and the like are to be construed in an inclusive sense, as opposed to an exclusive or exhaustive sense; that is to say, in the sense of “including, but not limited to.” The word “coupled”, as generally used herein, refers to two or more elements that may be either directly connected, or connected by way of one or more intermediate elements. Likewise, the word “connected”, as generally used herein, refers to two or more elements that may be either directly connected, or connected by way of one or more intermediate elements. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or” in reference to a list of two or more items, that word covers all of the following interpretations of the word: any of the items in the list, all of the items in the list, and any combination of the items in the list.

Moreover, conditional language used herein, such as, among others, “can,” “could,” “might,” “may,” “e.g.,” “for example,” “such as” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A piezoelectric microelectromechanical system microphone comprising:
- a support substrate;
- a diaphragm including a piezoelectric material attached to the support substrate and configured to deform and generate an electrical potential responsive to impingement of sound waves on the diaphragm;
- upper electrodes disposed on an upper surface of the diaphragm, the upper electrodes including upper inner electrodes and upper outer electrodes;
- lower electrodes disposed on a lower surface of the diaphragm, the lower electrodes including lower inner electrodes and lower outer electrodes, the diaphragm being divided into a plurality of sectors, a first sector of the plurality of sectors including an inner and an outer upper electrode physically disconnected from an inner and an outer upper electrode on a second sector adjacent to the first sector, and an inner and an outer lower electrode physically disconnected from an inner and an outer lower electrode on the second sector;
- a first conductive via extending between and electrically coupling the upper and lower inner electrodes of the first sector and in electrical communication with a first bond pad; and
- a second conductive via extending between and electrically coupling the upper and lower outer electrodes of the second sector and in electrical communication with a second bond pad.

2. The piezoelectric microelectromechanical system microphone of claim 1 wherein the diaphragm includes an upper layer of the piezoelectric material, a lower layer of the piezoelectric material, and inner and outer middle electrodes disposed at an interface between the upper and lower layers of piezoelectric material.

3. The piezoelectric microelectromechanical system microphone of claim 2 wherein the inner and outer middle electrodes in each of the plurality of sectors are electrically connected.

4. The piezoelectric microelectromechanical system microphone of claim 2 wherein the inner and outer middle electrodes in each of the plurality of sectors are electrically floating.

5. The piezoelectric microelectromechanical system microphone of claim 1 further comprising a third conductive via extending between and electrically connecting the upper and lower outer electrodes of the first sector.

6. The piezoelectric microelectromechanical system microphone of claim 5 further comprising a fourth conductive via extending between and electrically connecting the upper and lower inner electrodes of the second sector.

7. The piezoelectric microelectromechanical system microphone of claim 6 wherein the upper and lower outer electrodes of the first sector are electrically connected to the upper and lower inner electrodes of the second sector.

8. The piezoelectric microelectromechanical system microphone of claim 6 wherein the upper and lower outer electrodes of the first sector are electrically connected to upper and lower inner electrodes of a third sector adjacent to the first sector.

9. The piezoelectric microelectromechanical system microphone of claim 1 wherein the upper and lower outer electrodes of the first sector are electrically unconnected.

10. The piezoelectric microelectromechanical system microphone of claim 9 wherein the upper and lower inner electrodes of the second sector are electrically unconnected.

11. The piezoelectric microelectromechanical system microphone of claim 10 further comprising an electrical conductor extending between and electrically coupling the upper outer electrode of the first sector to the upper inner electrode of the second sector.

12. The piezoelectric microelectromechanical system microphone of claim 11 further comprising an electrical conductor extending between and electrically coupling the lower outer electrode of the first sector to the lower inner electrode of the second sector.

13. The piezoelectric microelectromechanical system microphone of claim 9 further comprising a third sector adjacent to the first sector and including upper and lower inner electrodes that are electrically unconnected.

14. The piezoelectric microelectromechanical system microphone of claim 13 further comprising an electrical conductor extending between and electrically coupling the upper outer electrode of the first sector to the upper inner electrode of the third sector.

15. The piezoelectric microelectromechanical system microphone of claim 14 further comprising an electrical conductor extending between and electrically coupling the lower outer electrode of the first sector to the lower inner electrode of the third sector.

16. The piezoelectric microelectromechanical system microphone of claim 1 wherein the diaphragm is circular.

17. An electronics device module including the piezoelectric microelectromechanical system microphone of claim 1.

18. An electronic device including the electronic device module of claim 17.

19. A telephone including the electronic device module of claim 17.

20. A method of forming the piezoelectric microelectromechanical system microphone of claim 1, the method comprising selecting areas of the upper and lower electrodes and a number of the plurality of sectors to provide the piezoelectric microelectromechanical system microphone with a desired output capacitance.

21. The method of claim 20 wherein the desired output capacitance matches a capacitance of circuitry electrically connected to the piezoelectric microelectromechanical system microphone.

* * * * *